United States Patent
Horn et al.

(10) Patent No.: US 9,817,720 B2
(45) Date of Patent: Nov. 14, 2017

(54) METHODS, APPARATUSES AND COMPUTER PROGRAM PRODUCTS ENABLING TO IMPROVE HANDOVER SECURITY IN MOBILE COMMUNICATION NETWORKS

(71) Applicant: NOKIA SOLUTIONS AND NETWORKS OY, Espoo (FI)

(72) Inventors: Guenther Horn, Munich (DE); Hinrich Eilts, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/438,956

(22) PCT Filed: Oct. 29, 2012

(86) PCT No.: PCT/EP2012/071350
§ 371 (c)(1),
(2) Date: Apr. 28, 2015

(87) PCT Pub. No.: WO2014/067542
PCT Pub. Date: May 8, 2014

(65) Prior Publication Data
US 2015/0269028 A1  Sep. 24, 2015

(51) Int. Cl.
*H04L 29/06* (2006.01)
*G06F 11/14* (2006.01)
(Continued)

(52) U.S. Cl.
CPC ........ *G06F 11/1402* (2013.01); *H04W 12/04* (2013.01); *H04W 36/0038* (2013.01); *H04W 36/08* (2013.01); *G06F 2201/875* (2013.01)

(58) Field of Classification Search
CPC .............................. H04L 63/06; H04W 12/04
See application file for complete search history.

(56) References Cited

U.S. PATENT DOCUMENTS

2010/0173610 A1* 7/2010 Kitazoe ............ H04W 36/0038
455/411
2011/0274276 A1  11/2011 Xu

FOREIGN PATENT DOCUMENTS

EP    2 197 147 A1    6/2010
GB    2472580 A       2/2011

OTHER PUBLICATIONS

3GPP TS 33.401 V12.5.1 (Oct. 2012), Technical Specification, 3rd Generation Partnership Project; Technical Specification Group Services and System Aspects; 3GPP System Architecture Evolution (SAE); Security architecture (Release 12), Oct. 24, 2012, pp. 1-121. Included in applicant's IDS.*

(Continued)

*Primary Examiner* — Jason K Gee
(74) *Attorney, Agent, or Firm* — Squire Patton Boggs (US) LLP (57) ABSTRACT

An apparatus comprises a memory unit, and a control unit connected to the memory unit. The apparatus can be configured to interface at least one access node; the control unit is configured to derive at least one local level security key within an established security context for a terminal, forward the derived local security key to at least one access node, and detect failures in a handover for a terminal being served by a first access node towards a second access node. The failures concern the interface between the apparatus and the second access node. In response to a verified trigger condition, the control unit can re-adjust local level security keys with keys maintained at the terminal within the established security context.

19 Claims, 4 Drawing Sheets

(51) Int. Cl.
*H04W 12/04* (2009.01)
*H04W 36/00* (2009.01)
*H04W 36/08* (2009.01)

(56) References Cited

OTHER PUBLICATIONS

3GPP TS 33.401 V11.5.0 (Sep. 2012) "3rd Generation Partnership Project; Technical Specification Group Services and System Aspects; 3GPP System Architecture Evolution (SAE); Security architecture (Release 11)"; 121 pages; 3rd Generation Partnership Project (3GPP); Mobile Competence Centre; 650, Route des Lucioles; F-06921 Sophia-Antipolis Cedex; France.

3GPP TS 24.301 V11.4.0 (Sep. 2012) "3rd Generation Partnership Project; Technical Specification Group Core Network and Terminals; Non-Access-Stratum (NAS) protocol for Evolved Packet System (EPS); Stage 3 (Release 11)"; 341 pages; 3rd Generation Partnership Project (3GPP); Mobile Competence Centre; 650, Route des Lucioles; F-06921 Sophia-Antipolis Cedex; France.

3GPP TS 36.331 V11.1.0 (Sep. 2012) "3rd Generation Partnership Project; Technical Specification Group Radio Access Network; Evolved Universal Terrestrial Radio Access (E-UTRA); Radio Resource Control (RRC); Protocol Specification (Release 11)"; 325 pages; 3rd Generation Partnership Project (3GPP); Mobile Competence Centre; 650, Route des Lucioles; F-06921 Sophia-Antipolis Cedex; France.

3GPP TR 21.905 V11.2.0 (Sep. 2012) "3rd Generation Partnership Project; Technical Specification Group Services and System Aspects; Vocabulary for 3GPP Specifications (Release 11)"; 64 pages; 3rd Generation Partnership Project (3GPP); Mobile Competence Centre; 650, Route des Lucioles; F-06921 Sophia-Antipolis Cedex; France.

International Search Report dated Sep. 19, 2013 corresponding to International Patent Application No. PCT/EP2012/071350.

3GPP TS 33.401 V12.5.1 (Oct. 2012), Technical Specification, 3rd Generation Partnership Project; Technical Specification Group Services and System Aspects; 3GPP System Architecture Evolution (SAE); Security architecture (Release 12), Oct. 24, 2012, pp. 1-121, XP050650391.

* cited by examiner

METHODS, APPARATUSES AND COMPUTER PROGRAM PRODUCTS ENABLING TO IMPROVE HANDOVER SECURITY IN MOBILE COMMUNICATION NETWORKS

FIELD OF THE INVENTION

The present invention relates to methods, apparatuses and computer program products enabling to improve handover security in mobile communication networks. In particular, the proposed methods, computer program products and apparatuses are for example applicable to scenarios within such networks, e.g. within an evolved packet system EPS network, in order to improve security of handovers HO taking place on a particular interface within such system.

BACKGROUND

Mobile data transmission and data services are constantly making progress. With the increasing usage of mobile communication, network organization and optimization is becoming more and more important. Also, in such context, security of handovers is being investigated, e.g. in the framework of LTE™ or LTE™-A and e.g. the EPS system and interfaces thereof, such as the so-called S1 interface between a network mobility entity e.g. also known as a mobility management entity, MME, and an access node providing (wireless) network access to a terminal such as a user equipment UE, the access node being e.g. also known as evolved NodeB, eNB.

Insofar, the present invention relates in particular but without limitation to mobile communications, for example to environments under LTE™ (Long Term Evolution) or LTE™-A (LTE™ Advanced), or any other communication scenario, potentially standardized by 3GPP ($3^{rd}$ Generation Partnership Project), ETSI (European Telecommunication Standards Institute) and/or other local or regional standardization bodies e.g. NGMN (Next Generation Mobile Networks), and can advantageously be implemented as or in chipsets, or modules, or units, or apparatuses of devices (e.g. network entities such as a transceiver device also known as base station, or NodeB, or evolved NodeB eNB, or e.g. a mobility management entity MME) forming part of those networks, as well as related terminal devices such as a so-called user equipment UE (e.g. smart-phones, a network-access enabled computers or laptops, or the like).

More particularly, as a specific example referred to in order to describe aspects of the present invention, the present invention relates to those apparatuses/units of devices or network entities that are applied in such communication networks or a part thereof, e.g. known as evolved packet system, EPS, network. Thus, security of handovers HO in such EPS network and security of handovers taking place with involvement of particular interfaces in such system, such as the so-called S1 interface between a MME and a eNB, are being considered.

With the evolution of LTE™ and/or EPS system, such cellular networks will become more and more complex, various and huge. For network operators, along with the uses of new technologies, to maintain security and/or data integrity is a big challenge.

The present invention relates to the security of handovers in LTE, and more specifically to failures of so-called S1 handovers, i.e. handovers, in which not only the eNBs, but also the MME are involved. Security of handovers is for example specified in 3GPP TS 33.401, more specifically in clause 7.2.8. thereof.

Figure 1:
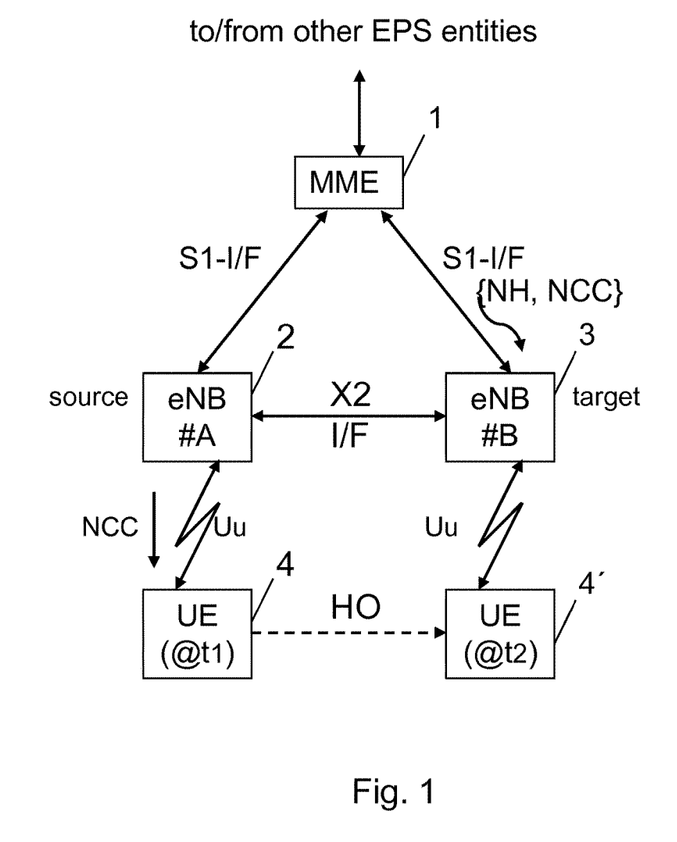

FIG. 1 illustrates some typical scenario for explanatory purposes. A network mobility entity referred to as mobility management entity MME is denoted by numeral 1. The MME has an interface/connection to other entities of the EPS (not shown in FIG. 1). Further, the MME has an interface known as S1 interface (S1-I/F) towards each of a plurality of access nodes referred to as evolved NodeBs, eNBs. Such access node eNB provides network access based on e.g. a wireless access technology for one or more terminals referred to as user equipments UE and denoted by numeral 4 and 4', respectively. A source eNB denoted by numeral 2 is labeled as eNB #A. A target eNB denoted by numeral 3 is labeled as eNB #B. The expression source and target pertains to an assumed mobility of a terminal UE (4, 4'). Namely, with a moving UE, a UE is at a time t1 served by eNB #A, but after a handover HO served by a eNB #B. An interface between eNBs is referred to a X2 interface, X2 I/F. An interface between an eNB, 2 and 3, respectively, and a terminal UE, 4 or 4', is referred to as Uu interface. In case of a handover between eNBs having an interface X2 there between, the HO typically takes place via the X2 interface. In case of a HO between eNBs without an X2 interface there between, the HO involves the S1 interface. In case of a HO via S1 interface, the MME derives, inter alia, parameters and/or keys such as {NH, NCC} and informs at least the NCC thereof to the target eNB which forwards it to the UE handed over in a handover command that is sent from the target eNB to the UE via the source eNB. Thus, NCC is forwarded to UE in a handover command that is sent from the target eNB to the UE via the source eNB, i.e. target eNB does not directly send NCC to UE over Uu.

In order to establish security in such EPS system architecture, various keys are established and/or derived in a hierarchical manner. E.g. a key K as a master or base key is stored permanently in an authentication centre AuC and universal subscriber identity module USIM. Using that key and various procedures such as one known as AKA (Authentication and Key Agreement) plural other keys in the hierarchical EPS system are generated and/or derived. Keys used at a specific entity or at a level of similar entities are also referred to herein as local level keys, whereas keys used to derive those may be referred to as higher level keys (determined/kept at hierarchically higher entities or nodes).

A key K_eNB, for example, is a eNB base key and set up/derived as intermediate key in a MME and UE based on other keys, e.g. upon a state transition of a terminal and/or by the UE and a target eNB upon handover of the terminal.

Particular focus in relation to the present invention will have to be put on keys referred to as "next hop", NH, and "next hop chaining counter", NCC, as will be explained below.

The use of Next Hop Chaining Counter (NCC) and Next Hop parameter (NH) is specified in TS 33.401, clause 7.2.8. Both the UE and the MME can derive NH from the current K_ASME, which was formerly generated and kept by MME and UE, and K_eNB in an iterative fashion according to TS 33.401, Annex A.4, when they know the K_ASME, K_eNB and the number of iterations, cf. TS 33.401, clause 7.2.2.

The NCC consists of the three least significant bits of the number of iterations performed in computing NH. Only NCC is transmitted to the UE in a handover for efficiency reasons. The UE can correctly derive a new NH from the currently stored {NH, NCC} pair and a newly received NCC only if that newly received NCC relates to an NH that was computed in the MME by at most seven iterations from the NH equal to the one stored in the UE. (This is a simple consequence of the fact that NCC has only three bits.)

In an S1 handover, the MME computes a new NH parameter, thereby increasing NCC by 1—with the exception marked with (**) below— and sends the {NH, NCC} pair to the target eNB. After a successful S1 handover, both UE and MME will have the same {NH, NCC} pair stored. When the S1 handover fails the MME will have increased NCC by 1 while the NCC in the UE will remain the same.

(**) Exception: The first NH sent to an eNB after the K_eNB was established corresponds to NCC=2, according to the rules in TS 33.401, clause 7.2.8.

In an X2 handover (including the Path Switch procedure), the MME computes a new NH parameter, thereby increasing NCC by 1—but see exception (**) above—, and sends the {NH, NCC} pair to the target eNB, in the Path Switch Acknowledge message, i.e. only after the handover had been successfully completed between UE, source eNB and target eNB.

So, an unsuccessful X2 handover has no effect on the NCC value in UE and MME. The new {NH, NCC} pair created in a successful X2 handover will be used only in the next vertical X2 handover, hence the UE will not learn about this new NCC value until then. While the effect of a successful X2 handover (including the Path Switch procedure) on the NCC value in the MME is straightforward the effect on the NCC value in the UE is a bit tricky to determine and depends on the history of handovers as follows:

If the current X2 handover is the first successful (S1 or X2) handover after the K_eNB was established then NCC does not change in the UE; the difference between the NCC values in UE and MME after the current X2 handover increases by 1 (if there was a preceding failed S1 HO) or 2 otherwise, cf. (**) above.

If the preceding successful handover was an S1 handover then NCC does not change in the UE; the difference between the NCC values in UE and MME after the current X2 handover increases by 1;

If the preceding successful handover was an X2 handover then NCC in the UE is set to the value of the NCC sent by the MME in that preceding handover; the amount by which the NCC value increases in the UE depends on the history even before that preceding handover; but the difference between the NCC values in UE and MME after the current X2 handover is more amenable to computation: it is equal to the number of failed S1 handovers between the current and the preceding X2 handovers plus 1.

It was observed in laboratory tests by applicant that S1 handover failures may lead to loss of synchronization of so-called NextHop (NH) parameter between UE and MME and consequently to a connection failure. Namely, applicant observed in laboratory tests that S1 handover requests could be rejected several times, while the UE remained connected to the same source eNB. Those tests involved a low mobility case, in a scenario where a laptop was being moved from one corner of a building to another one. This move caused an S1 handover attempt, which failed due to the target eNB being congested. By this, the NCC value was increased by 1 in the MME while it remained the same in the UE, because the new NCC value could not propagate from the MME via the new target eNB towards the UE due to the handover failure, or, stated in other words, because the new NCC will only be propagated to UE if the handover actually happens.

The radio conditions permitted the UE to remain connected to the source eNB. As the laptop did not move any further the radio conditions did not change any further, and, after some time, another S1 handover attempt was made, failing again (and increasing the NCC value in the MME again), while the UE still remained connected to the source eNB. When finally a successful (S1 or X2) handover was made this then led to a condition (according to the 'background' information above) where a UE and an MME would compute different NH parameters and, hence, the UE and the eNB would compute different AS level cryptographic keys, leading to a connection failure.

The observed scenario is plausible enough, and the negative impact sufficiently important, to warrant implementing countermeasures.

Generally, prior art can be found in 3GPP TS 33.401 and the related stage 3 specifications 3GPP TS 24.301 and 3GPP TS 36.331. An NCC length of three bits has so far been considered sufficient to prevent any loss of synchronization due to handover failures.

To the inventors' knowledge, the failure case observed in applicant's laboratory tests described above has not been publicly discussed yet. Hence, as the problem had not been revealed, no countermeasures have been proposed so far.

Generally, as a countermeasure it is conceivable to use a K_eNB re-keying as specified in 3GPP TS 33.401, clause 7.2.9.2. This could be used to re-synchronize the NH parameter in MME and UE. The big disadvantage of this re-keying procedure is that it requires a run of the EPS AKA authentication protocol. This, however, is undesirable as operators are currently looking for ways to reduce the load on the home subscriber server, HSS, caused by authentications, which is considered too high already.

Thus, there is still a need to further improve such systems.

SUMMARY

Various aspects of examples of the invention are set out in the claims.

According to a first aspect of the present invention, there is provided
an apparatus as set out in claim 1
and a method as set out in claim 11.

Advantageous further developments are as set out in respective dependent claims in relation to each of the above aspects.

According to a further aspect of the present invention, there are provided computer program products comprising computer-executable components which, when the program is run on a computer, are configured to implement and/or carry out the above method aspects. Those computer program product/products may be embodied as a computer-readable storage medium.

Thus, improvement is based on methods, apparatuses and computer program products according to at least one or more embodiments covered by the above aspects.

For example:
  the concepts as presented in line with aspects of the invention are in particular applicable for an eNodeB and/or a MME, for example;
  more particularly, the concepts as presented in line with aspects of the invention will also be applicable to e.g. a follow-up version of 3GPP TS 33.401, "Security of handovers" as e.g. specified in particular in its clause 7.2.8., and lead to an updated version thereof;
  aspects of the invention encompass countermeasures which prevent that {NH, NCC} pairs in UE and MME get out of synch due to a number of S1 handover failures;

one aspect suppresses a key change performed by a terminal, another aspect prevents a AKA run being necessary to be performed.

BRIEF DESCRIPTION OF DRAWINGS

For a more complete understanding of example embodiments of the present invention, reference is now made to the following descriptions taken in connection with the accompanying drawings in which:

FIG. 1 illustrates an overview of some entities of an EPS network and interfaces there between;

DESCRIPTION OF EXEMPLARY EMBODIMENTS

Examples of aspects of the invention will be described herein below.

In various standards, different names may apply for those entities. Therefore, as a mere example only that was chosen to describe a possible implementation framework of the present invention, reference is made to LTE™ EPS and related documents, especially 3GPP TS 33.401. Abbreviations and definitions as set out in such documents/context shall also apply for the purpose of describing at least concepts/embodiments of this invention, though those are not intended to limit the applicability of those concepts/embodiments to other telecommunication environments.

In brief, according to at least aspects of the invention, countermeasures are proposed which prevent that {NH, NCC} pairs of keys in a terminal UE and MME get out of synchronization due to a number of S1 handover failures.

Generally, in terms of a network mobility entity, e.g. a MME, aspects of the invention encompass an apparatus, comprising a memory unit; and a control unit connected to the memory unit, the apparatus being configured to interface at least one access node wherein the control unit of the network mobility entity is configured to process one or more higher level security keys received from a network entity to derive at least one local level security key within an established security context for a terminal, forward said derived local security key to at least one access node, detect failures in a handover for a terminal being served by a first access node towards a second access node, wherein the failures in the handover concern the interface between the apparatus and said second access node, verify a trigger condition based on the handover failure history, and responsive to the trigger condition verified, invoke a context modification procedure to re-adjust local level security keys with keys maintained at the terminal within the established security context.

The at least one local level security key is a next hop, NH, key and a next hop chaining counter, NCC. Further, the trigger condition represents a number of past failed handovers concerning the interface between the apparatus and said second access node. The number of past failed handovers is used to limit the maximum difference of next hop chaining counter, NCC, in the MME and the UE. I.e. with NCC being 3 bit only a maximum number/count of 7 is possible before NCC wraps around, so that with due account of the above description in the background section, the trigger condition will be 5 failed S1 handovers. With this trigger condition, it can be avoided that the difference in the NCC values in the MME and the UE increases beyond 7 if the trigger condition triggers an action that leads to a re-synchronization of NCC in MME and UE. However, in case of a NCC being less or more than 3 bit in length, the number of failed S1 handovers as trigger condition will vary accordingly (e.g. in case of a NCC of 4 bit and maximum count of 15 being possible, the trigger condition would be 13 failed S1 handovers).

In relation to the MME, a particular aspect involves that the context modification procedure invoked is a terminal context modification procedure associated to the terminal to be handed over. Hence, here the control unit is configured to compose a terminal context modification request message comprising the latest local security keys, wherein next hop chaining counter, NCC, as one of the local level security keys is included in a distinct information element, and forward it to the first access node.

In relation to the MME, another particular aspect involves that the context modification procedure invoked is a network access stratum security mode procedure associated to the terminal to be handed over. Hence, here the control unit is further configured to initiate a new network access stratum security mode procedure based on an evolved key set identifier, eKSI, and associated algorithms, obtain, as a result thereof, an updated parameter for such procedure, process the obtained updated parameter together with an intermediate base key of an access security management entity, K_ASME, to derive therefrom a fresh access node base key, K_eNB, as a local level security key, and forward it to the access node that is currently serving the terminal.

With reference to aspects related to an access node, eNB, aspects involve an apparatus, comprising a memory unit; and a control unit connected to the memory unit, the apparatus being configured to interface at least a network mobility entity, wherein the control unit is configured to receive a message from the network mobility entity invoking a context procedure to re-adjust local level security keys with keys maintained at the terminal within the established security context.

A particular aspect of the eNB involves that the control unit is further configured to receive a terminal context modification request message comprising the latest local security keys, detect that a next hop chaining counter, NCC, as one of the local level security keys is included in a distinct information element, responsive thereto invalidate a key change indicator, and compose an access resource connection reconfiguration message including the invalidated key change indicator for transmission towards the terminal.

Another particular aspect thereof involves that the control unit of the access node is further configured to receive, resulting from a network access stratum security mode procedure invocation associated to the terminal to be handed over, a fresh access node base key, K_eNB, as a local level security key from the network mobility entity, and perform re-keying of temporary keys using that fresh key, to derive, based thereon, at least one local level security key.

Similar notions as made above with reference to apparatus aspects apply likewise to related method aspects.

Figure 2:
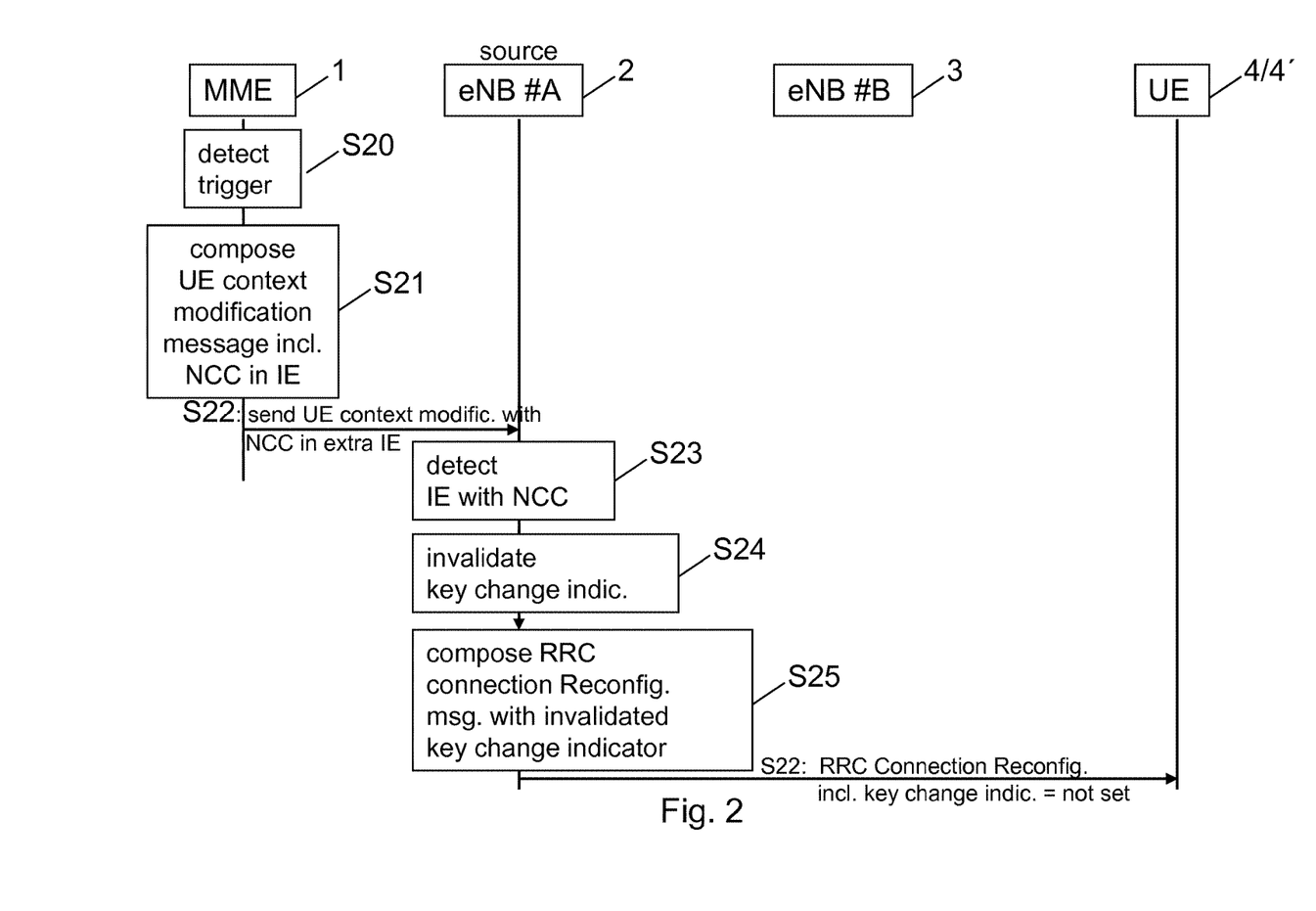
FIG. 2 illustrates a schematic signaling diagram according to an aspect or embodiment of the invention.
Figure 3:
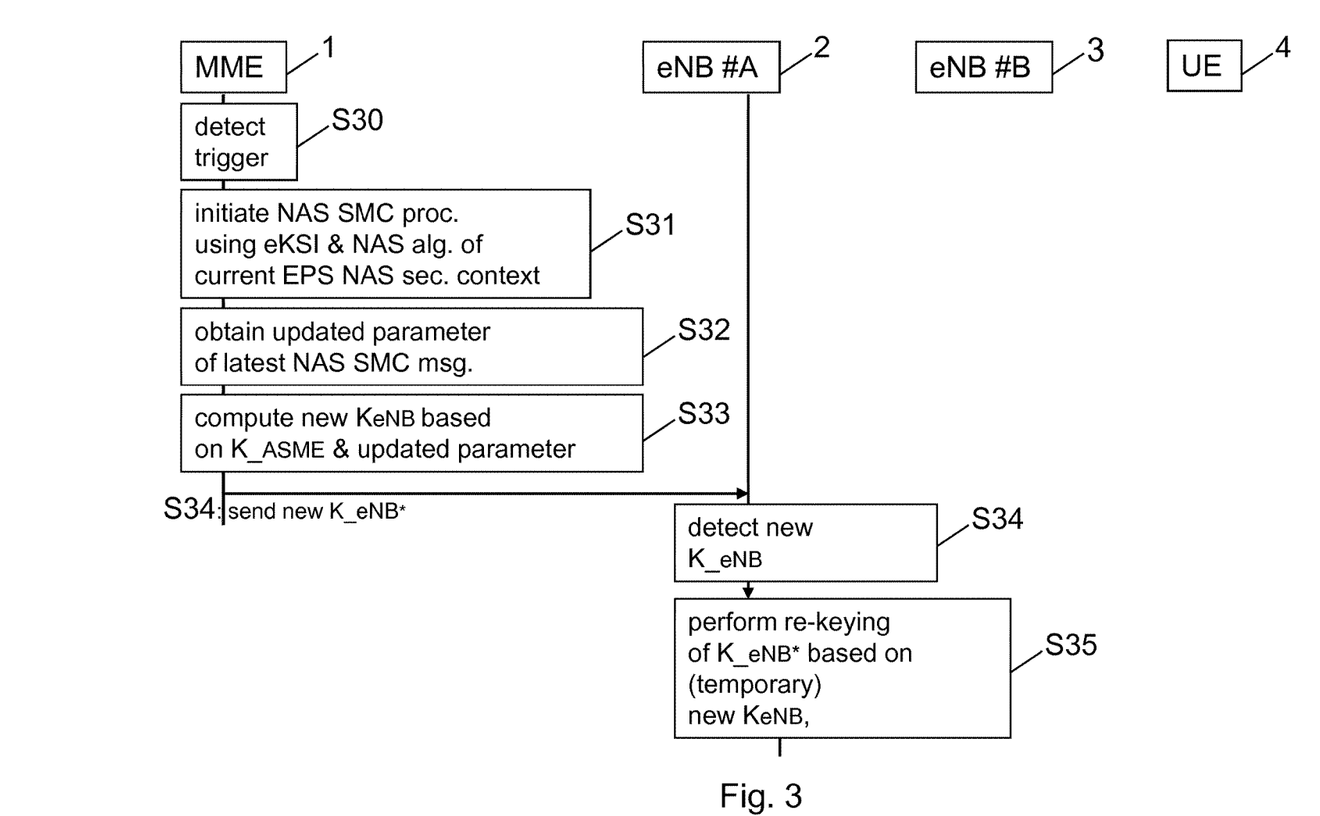
FIG. 3 illustrates a schematic signaling diagram according to a further aspect or embodiment of the invention

The above will be set out in greater detail with reference to the signaling diagrams in FIGS. 2 and 3. In both Figures, entities (potentially) involved are depicted in horizontal direction and are as those explained with reference to FIG. 1. A processing at the respective entity is depicted in vertical direction, thus at least partly also reflecting the series of processing in time. Signaling exchanged is illustrated by arrows from one entity to another entity.

According to one aspect of the invention, as illustrated in FIG. 2, there is proposed a solution which enforces an {NH, NCC} alignment by a modified S1AP: UE CONTEXT MODIFICATION procedure.

As shown in FIG. 2, a MME 1 detects in a stage S20 a trigger condition. In a subsequent stage S21, the MME (a control unit of an apparatus thereof) composes a UE context modification message including the NCC in an information element thereof. In a stage S22, the MME sends this message to the source eNB.

The eNB #A (numeral 2), in a stage S23, detects the information element IE including the NCC in the message received. Responsive thereto, in stage S24, it invalidates a key change indicator that would otherwise be set. In a stage S25, the eNB #A composes a RRC connection reconfiguration message including the invalidated key change indicator, and sends it in a stage S26 to the terminal UE (4, 4') i.e. the invalidated key change indicator means that this parameter is not set in the message. The UE then proceeds "as normal" based on this message with the changed (not set) parameter which in the end will serve to align the {NH, NCC} keys.

Thus, as described above, in brief, if a selected trigger condition (cf. below for an example) is fulfilled the MME sends S1AP: UE CONTEXT MODIFICATION to eNB to enforce {NH, NCC} alignment via intra-cell handover. The MME sends its latest {NH, NCC} pair to the eNB, which applies it using intra-cell handover. This solution requires an extension of the S1AP: UE CONTEXT MODIFICATION procedure by including a new IE for the NCC. Furthermore, when receiving such a modified S1AP: UE CONTEXT MODIFICATION message with the NCC included, the eNB would have to send the corresponding RRCConnectionReconfiguration message with the keyChangeIndicator IE not set, contrary to how the eNB currently reacts.

According to another aspect of the invention, as illustrated in FIG. 3, there is proposed a solution which introduces a new K_eNB re-keying procedure without AKA.

As shown in FIG. 3, a MME 1 detects in a stage S30 a trigger condition. In a subsequent stage S31, the MME (a control unit of an apparatus thereof) initiates a network access stratum NAS SMC procedure. This procedure uses the eKSI & NAS algorithm of the current EPS NAS security context. As a result thereof, in stage S32 an updated parameter of the latest NAS SMC message is obtained i.e. the parameter 'uplink NAS COUNT used in the latest NAS Security Mode Complete message'. Based on that updated parameter a new K_eNB is computed based on the existing/known K_ASME in a stage S33, and then sent to the eNB #A (denoted by numeral 2) currently serving the UE in stage S34. The eNB 2 in a stage S35 detects the new K_eNB and subsequently in stage S36 performs re-keying of K_eNB* based on the (temporary) new K_eNB by sending a RRC connection reconfiguration message including the key change indicator set, i.e. valid. This establishes a new K_eNB, which leads to NH and NCC being reset in the MME and the UE, i.e. NH is set equal to K_eNB and NCC is set to zero. This achieves the desired re-adjustment of NH and NCC in MME and UE. Namely, when a new K_eNB is established, as is the case here, this amounts to a reset for NH and NCC, i.e. NH is now equal to K_eNB and NCC=0 in both MME and UE. Therefore, the desired re-synchronisation of NH and NCC in MME and UE is achieved at this point.

Subsequently, (not shown in FIG. 3), the flow process could continue for example in that after S36, a message, e.g. a RRC connection reconfiguration message including the key change indicator set mentioned above, is sent from eNB to UE instructing to change K_eNB. Thereupon, as a processing action inside the UE, the UE performs a reset of {NH, NCC}, acknowledges this in a message from the UE to eNB indicating successful reset, which is propagated further from the eNB to the MME indicating success. Thereupon, also a processing action inside the MME performs a reset of {NH, NCC}.

Thus, as described above, in brief, if a selected trigger condition (cf. below for an example) is fulfilled the MME invokes a new K_eNB re-keying procedure. This procedure is based on the idea that a fresh K_eNB can be derived also from an existing K_ASME if only the parameter 'uplink NAS COUNT used in the latest NAS Security Mode Complete message' is updated before the K_eNB derivation by running a new NAS Security Mode procedure with the same eKSI and algorithms as the current EPS NAS security context. This solution avoids the undesirable additional run of an EPS AKA authentication.

An example of a trigger condition mentioned for FIGS. 2 and 3 is as follows: The number of failed S1 HOs after initial K_eNB establishment is counted, and when this counter reaches the value 5 then the establishment of a new K_eNB is triggered.

Although at least aspects of the invention have been explained herein above with a rather general reference to impacts on existing standards, with regard to above other aspect, this would particularly effect sections 7.2.8.4 and 7.2.9.2 of 3GPP TS 33.401 as outlined e.g. herein below as embraced by the intermediate asterisks lines:
******************

7.2.8.4.3 S1-Handover

Upon reception of the HANDOVER REQUIRED message the source MME shall increase its locally kept NCC value by one and compute a fresh NH from its stored data using the function defined in Annex A.4. The source MME shall store that fresh pair and send it to the target MME in the S10 FORWARD RELOCATION REQUEST message. The S10 FORWARD RELOCATION REQUEST message shall in addition contain the K_ASME that is currently used to compute {NH, NCC} pairs and its corresponding eKSI.

The target MME shall store locally the {NH, NCC} pair received from the source MME.

The target MME shall then send the received {NH, NCC} pair to the target eNB within the S1 HANDOVER REQUEST.

Upon receipt of the S1 HANDOVER REQUEST from the target MME, the target eNB shall compute the K_eNB to be used with the UE by performing the key derivation defined in Annex A.5 with the fresh{NH, NCC} pair in the S1 HANDOVER REQUEST and the target PCI and its frequency EARFCN-DL. The target eNB shall associate the NCC value received from MME with the K_eNB. The target eNB shall include the NCC value from the received {NH, NCC} pair into the HO Command to the UE and remove any existing unused stored {NH, NCC} pairs.

NOTE: The source MME may be the same as the target MME in the description in this subclause. If so the single MME performs the roles of both the source and target MME, i.e. the MME calculates and stores the fresh {NH, NCC} pair and sends this to the target eNB.

For S1-handover, the source eNB shall include AS algorithms used in the source cell (ciphering and integrity algorithms) in the source to target transparent container that shall be sent to the target eNB. The AS algorithms used by in the source cell are provided to the target eNB so that it can decipher and integrity verify the RRCReestablishmentComplete message on SRB1 in the potential RRCConnectionReestablishment procedure.

Failed S1 handovers cause the NCC value to increase in the MME while it remains the same in the UE. Repeated failed S1 handovers may hence cause loss of synchronisation of {NH, NCC} pairs in the UE and MME and cause connection failures. The MME shall implement suitable trigger condition(s) and shall invoke a K_eNB re-keying procedure, as described in clause 7.2.9.2, when one of these trigger conditions is met in order to prevent synchronisation loss of {NH, NCC} pairs. When a non-current partial or full native EPS security context is available, a K_eNB re-keying procedure making use of one of these contexts shall be invoked, otherwise a K_eNB re-keying procedure deriving a new K_eNB from the current K_ASME shall be invoked. The precise nature of the trigger conditions is left to implementation.

NOTE: An example of such a trigger condition is as follows: The number of failed S1 HOs after initial K_eNB establishment is counted, and when this counter reaches the value 5 then the establishment of a new K_eNB is triggered.

7.2.9.2 K_eNB Re-Keying

The re-keying procedure is initiated by the MME after a successful AKA run with the UE to activate a partial native EPS security context, or to re-activate a non-current full native EPS security context after handover from GERAN or UTRAN according to subclauses 9.2.2.1 and 10.3.2, or to create a new K_eNB from the current K_ASME.

In case the procedure is initiated by the MME after a successful AKA run with the UE, the MME derives the new K_eNB using the key derivation function as specified in Annex A.3 using the new K_ASME and the uplink NAS COUNT used in the most recent NAS Security Mode Complete message. The K_eNB is sent to the eNB after a successfully completed NAS SMC in a S1 AP UE CONTEXT MODIFICATION REQUEST message triggering the eNB to perform the re-keying. The eNB runs the key-change-on-the-fly procedure with the UE. During this procedure the eNB shall indicate to the UE that a key change on-the-fly is taking place. The procedure used is based on an intra-cell handover, and hence the same K_eNB derivation steps shall be taken as in a normal handover procedure.

When the UE receives an indication that the procedure is a key change on-the-fly procedure, the UE shall use the K_ASME from the current EPS NAS security context as the basis for K_eNB derivations.

NOTE 1: To perform a key change on-the-fly of the entire key hierarchy, the MME has to change the EPS NAS security context before changing the AS security context.

If the UE has determined that the eKSI has changed, the UE shall derive a temporary K_eNB by applying the key derivation function as specified in Annex A.3, using the uplink NAS COUNT in the most recent NAS Security Mode Complete message and the new K_ASME as input. From this temporary K_eNB the UE shall derive the K_eNB* as normal (see clause A.5). The eNB shall take the K_eNB it received from the MME, which is equal to the temporary K_eNB, as basis for its K_eNB* derivations. From this step onwards, the key derivations continue as in a normal handover.

If the AS level re-keying fails, then the MME shall complete another NAS security mode procedure before initiating a new AS level re-keying. This ensures that a fresh K_eNB is used.

In case the re-keying procedure is initiated by the MME to re-activate a non-current full native EPS security context after handover from GERAN or UTRAN the same procedure as above applies.

In case the re-keying procedure is meant to create a new K_eNB from the current K_ASME the MME shall first initiate a NAS SMC procedure with the same eKSI and NAS algorithms as in the current EPS NAS security context. The purpose of this NAS SMC procedure is solely to update the parameter 'uplink NAS COUNT used in the latest NAS Security Mode Complete message'. All other parameters in the current EPS NAS security context remain unchanged. The MME computes a new K_eNB using this uplink NAS COUNT, according to Annex A.3, and sends it to the eNB in a S1 AP UE CONTEXT MODIFICATION REQUEST message triggering the eNB to perform the re-keying. The remainder of the procedure is as described above.

One condition for invoking a re-keying procedure that creates a new K_eNB from the current K_ASME is described in clause 7.2.8.4.3. Invocations of this procedure by other trigger conditions are subject to operator policy.

For all variants of a K_eNB re-keying procedure, the NH parameter shall be handled according to the following rules:

UE and MME shall use NH derived from old K_ASME before the context modification is complete, i.e. for the UE when it sends the RRC Connection Reconfiguration Complete, and for the MME when it receives the UE CONTEXT MODIFICATION RESPONSE. In particular, the MME shall send an NH derived from old K_ASME in the S1AP HANDOVER RESOURCE ALLOCATION, S10 FORWARD RELOCATION, and S1AP PATH SWITCH REQUEST ACKNOWLEDGE messages before the context modification is complete.

The eNB shall delete any old NH upon completion of the context modification.

The UE and MME shall delete any old NH upon completion of the context modification. After the completion of the context modification, the UE and the MME shall derive any new NH parameters from the new K_eNB and the new K_ASME according to Annex A.4.

*****************

Figure 4:
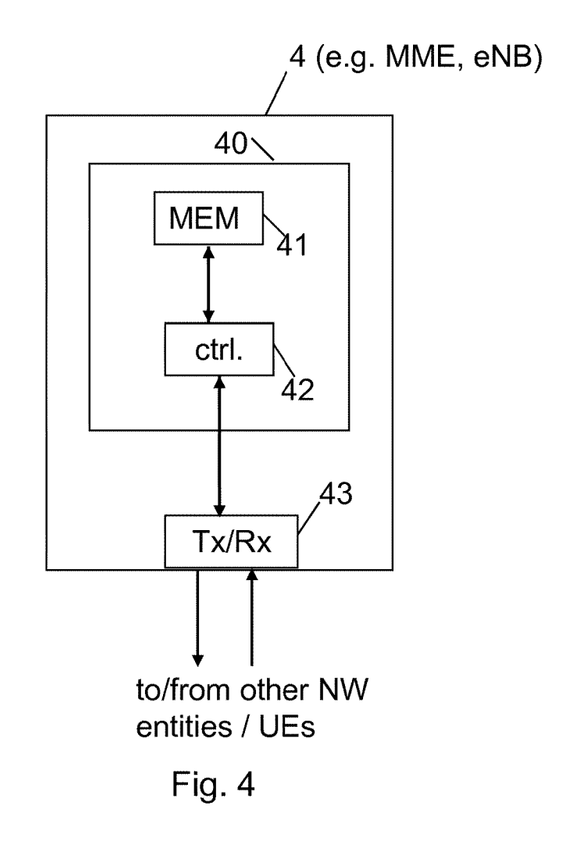
FIG. 4 illustrates an example of a basic block circuit diagram of a network mobility entity, e.g. a MME, or an access node, such as a eNB.

FIG. 4 shows, supplementing the above description of aspects of the invention, a basic block circuit diagram of a network entity such as a eNB and/or MME, in which embodiments of the present invention are implemented. Thus, the entity 4 can be any kind of eNB, e.g. a source eNB, SeNB, or a target enB, TeNB, and may also unite SeNB or HeNB properties/functionalities in some scenarios with those of a mobility management entity MME.

The eNB/MME, denoted by numeral 4, comprises a interface, Tx/Rx, cf. numeral 43, for transmission to/reception from another EPS network entity, e.g. another eNB and/or a UE. The interface is bidirectional connected to a control module or unit such as a processor, e.g. a digital signal processor, DSP, or ASIC (ASIC=application specific integrated circuit), CPU (central processing unit), or the like, denoted by numeral 42. The control module or unit (aka controller) is bidirectional connected to a memory module or unit (aka memory) MEM, denoted by numeral 41. The memory module can be any type of memory to which data can be written and from which data can be read, e.g. a Flash memory, RAM (Random Access Memory), or also EPROM (Electrically Programmable Read Only Memory). The memory module is configured to store at least data necessary for implementation of the invention, e.g. control code, acquired and/or processed data to be used for implementing/realizing at least aspects of the invention.

Thus, the memory module can be a separate memory module or a partition of a memory module storing also other user/control data handled by the eNB/MME. Other memory modules may be present, too, in the entity. Examples of the invention can be embodied in an apparatus or unit of the eNB/MME, e.g. denoted by numeral 40, comprising at least the modules 42 and 41 above.

Note that embodiments of the present invention may be implemented in software, hardware, application logic or a combination of software, hardware and application logic. The software, application logic and/or hardware generally resides on a module or unit, or chipset or apparatus associated to a device, i.e. mounted/inserted or mountable/insertable to or configured as a part of such a device, such as a network entity like an MSS or similar functionality.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

If desired, the different functions discussed herein may be performed in a different order and/or concurrently with each other. Furthermore, if desired, one or more of the above-described functions may be optional or may be combined.

Although the above description focused on an algorithm aspect, it is to be understood that the algorithm is configurable to corresponding hardware or implemented as software code loaded to a processor.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes computer program claims, methods and apparatuses enabling to improve security in handovers in mobile communication networks, and for example, an apparatus, comprising a memory unit; and a control unit connected to the memory unit, the apparatus being configured to interface at least one access node, wherein the control unit of the apparatus is configured to process one or more higher level security keys received from a network entity to derive at least one local level security key within an established security context for a terminal, forward said derived local security key to at least one access node, detect failures in a handover for a terminal being served by a first access node towards a second access node, wherein the failures in the handover concern the interface between the apparatus and said second access node, verify a trigger condition, and, in response to the trigger condition verified, invoke a context modification procedure to re-adjust local level security keys with keys maintained at the terminal within the established security context. According to aspects thereof this leads to advantages of suppression of a key change performed by a terminal, and prevention of a AKA run.

List of some acronyms and abbreviations as used herein above:
HO handover
RRM Radio Resource Management
UE User Equipment
HeNB Host eNodeB
SeNB Source eNodeB
TeNB Target eNodeB
EPS Evolved Packet System
Other acronyms are conformant to those mentioned in 3GPP TR 21.905 or 3GPP TS 33.401.

What is claimed is:

1. An apparatus comprising:
a memory unit; and
a processor connected to the memory unit,
wherein the apparatus is configured to interface with at least one access node, and wherein the processor and the memory unit are configured at least to:
process one or more higher level security keys received from a network entity to derive at least one local level security key within an established security context for a terminal;
forward said derived at least one local level security key to the at least one access node; and
invoke a context modification procedure to re-adjust the at least one local level security key with at least one local level security key maintained at the terminal within the established security context,
wherein a re-keying procedure for the at least one access node is performed in which a network access stratum security mode command procedure is initiated, and an updated network access stratum count parameter of a most recent network access stratum security mode command message is obtained, with the updated network access stratum parameter being used to derive a new key for the at least one access node computed based on an existing higher level security key, the new key being provided to the at least one access node for a radio resource control reconfiguration performed between the at least one access node and a terminal, and the re-keying procedure being performed without performing an Authentication and Key Agreement procedure.

2. The apparatus according to claim 1, wherein the at least one local level security key is a next hop (NH) key and a next hop chaining counter (NCC) being used as a key.

3. The apparatus according to claim 1, wherein a trigger condition is verified by the apparatus, and wherein the trigger condition represents a number of past failed handovers concerning the interface between the apparatus and a second access node.

4. The apparatus according to claim 3, wherein the number of past failed handovers depends on a maximum number of a next hop chaining counter (NCC) as at least one of the local level security keys.

5. The apparatus according to claim 1, wherein the context modification procedure invoked is a terminal context modification procedure associated with the terminal to be handed over.

6. The apparatus according to claim 5, wherein the processor and the memory unit are configured at least to:
compose a terminal context modification request message comprising a latest one of the at least one local level security key, wherein a next hop chaining counter (NCC) as at least one of the local level security key is included in a distinct information element; and forward the distinct information element to a first access node.

7. The apparatus according to claim 1, wherein the context modification procedure invoked is a network access stratum security mode procedure associated with the terminal to be handed over.

8. The apparatus according to claim 7, wherein the control unit and the processor are further configured at least to:
initiate a new network access stratum security mode procedure based on an evolved key set identifier (eKSI) and associated algorithms;
obtain, based on the new network access stratum security mode procedure, the updated network access stratum parameter for such procedure;
process the obtained updated parameter together with an intermediate base key of an access security management entity (K_ASME) to derive a fresh access node base key (K_eNB) as the at least one of the local level security key; and
forward the fresh access node base key to the access node.

9. A method comprising:
processing one or more higher level security keys received from a network entity to derive at least one local level security key within an established security context for a terminal;
forwarding said derived at least one local level security key to at least one access node; and
invoking a context modification procedure to re-adjust the at least one local level security key with at least one local level security key maintained at the terminal within the established security context,
wherein a re-keying procedure for the at least one access node is performed in which a network access stratum security mode command procedure is initiated, and an updated network access stratum count parameter of a most recent network access stratum security mode command message is obtained, with the updated network access stratum parameter being used to derive a new key for the at least one access node computed based on an existing higher level security key, the new key being provided to the at least one access node for a radio resource control reconfiguration performed between the at least one access node and a terminal, and the re-keying procedure being performed without performing an Authentication and Key Agreement procedure.

10. The method according to claim 9, wherein the at least one local level security key is a next hop (NH) key and a next hop chaining counter (NCC) being used as a key.

11. The method according to claim 9, wherein a trigger condition is verified by the another network entity, and wherein the trigger condition represents a number of past failed handovers concerning the interface between another network entity and a second access node.

12. The method according to claim 11, wherein the number of past failed handovers depends on a maximum number of a next hop chaining counter (NCC) as at least one of the local level security keys.

13. The method according to claim 9, wherein the context modification procedure invoked is a terminal context modification procedure associated with the terminal to be handed over.

14. The method according to claim 13 further comprising:
composing a terminal context modification request message comprising a latest one of the at least one local level security key, wherein a next hop chaining counter (NCC) as at least one of the local level security key is included in a distinct information element; and
forwarding the distinct information element to a first access node.

15. The method according to claim 9, wherein the context modification procedure invoked is a network access stratum security mode procedure associated with the terminal to be handed over.

16. The method according to claim 15, further comprising:
initiating a new network access stratum security mode procedure based on an evolved key set identifier (eKSI) and associated algorithms;
obtaining, based on the new network access stratum security mode procedure, the updated network access stratum parameter for such procedure;
processing the obtained updated parameter together with an intermediate base key of an access security management entity (K_ASME) to derive a fresh access node base key (K_eNB) as the at least one of the local level security key; and
forwarding the fresh access node base key to the access node.

17. A computer program product embodied on a non-transitory computer-readable medium, said product comprising computer-executable components which, when the program is run on a computer, are configured to perform the method steps according to claim 9.

18. A system comprising an access node, a user equipment, and an apparatus, the apparatus comprising:
a memory unit; and
a processor connected to the memory unit,
wherein the apparatus is configured to interface with at least one access node, and wherein the processor and the memory unit are configured at least to:
process one or more higher level security keys received from a network entity to derive at least one local level security key within an established security context for a terminal;
forward said derived at least one local level security key to the at least one access node; and
invoke a context modification procedure to re-adjust the at least one local level security key with at least one local level security key maintained at the terminal within the established security context,
wherein a re-keying procedure for the at least one access node is performed in which a network access stratum security mode command procedure is initiated, and an updated network access stratum count parameter of a most recent network access stratum security mode command message is obtained, with the updated network access stratum parameter being used to derive a new key for the at least one access node computed based on an existing higher level security key, the re-keying procedure being performed without performing an Authentication and Key Agreement procedure, and
wherein a radio resource control reconfiguration is performed between the at least one access node and a terminal using the new key.

19. A system according to claim 18 in which the new key for the access node is provided to at least one of the access node and the user equipment.

* * * * *